Patented July 5, 1938

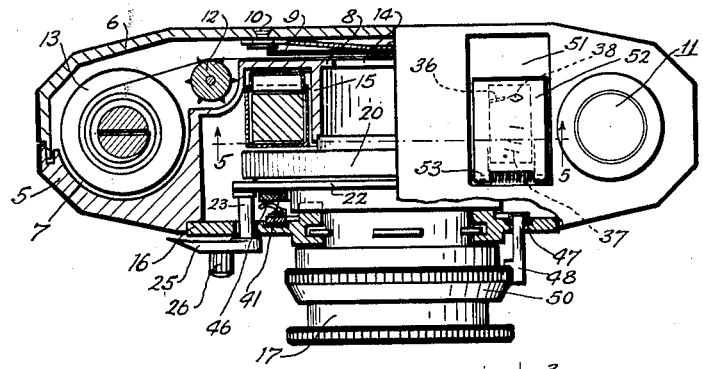
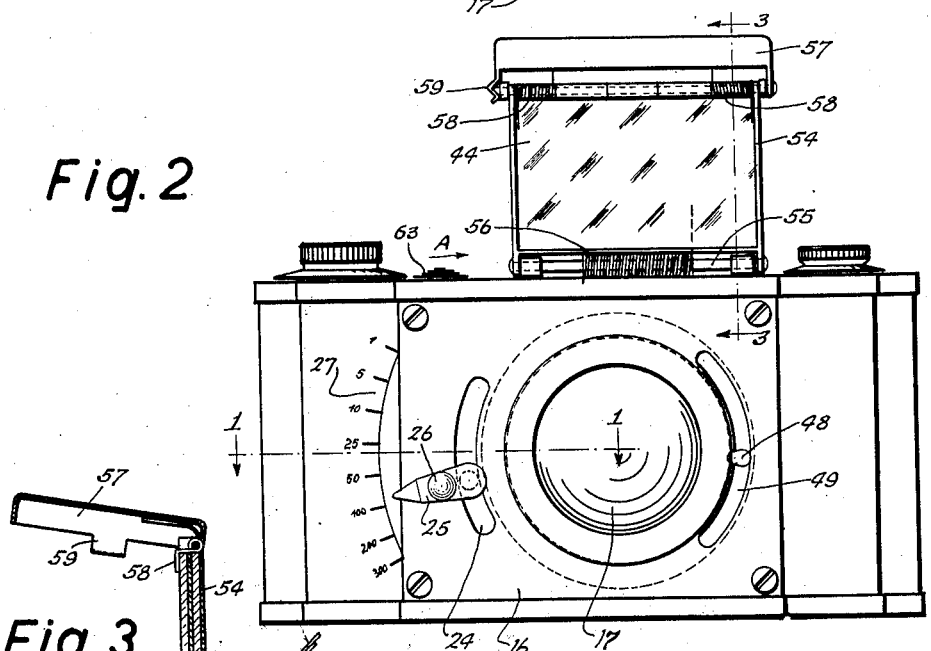
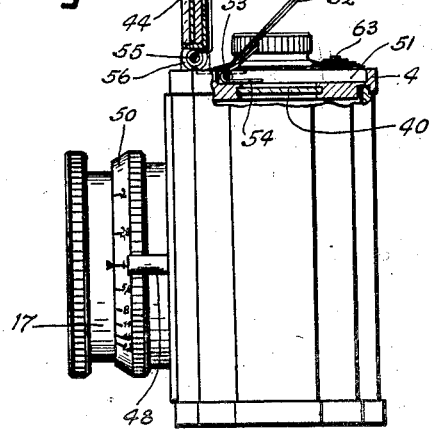

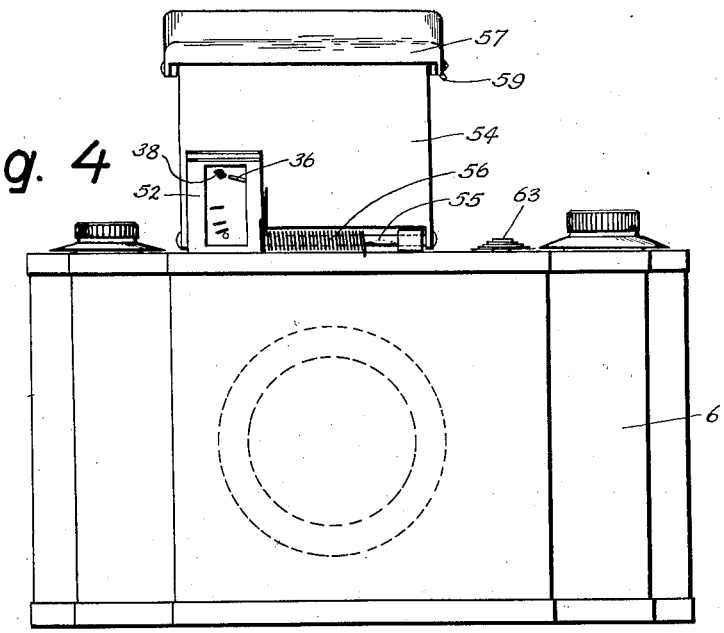
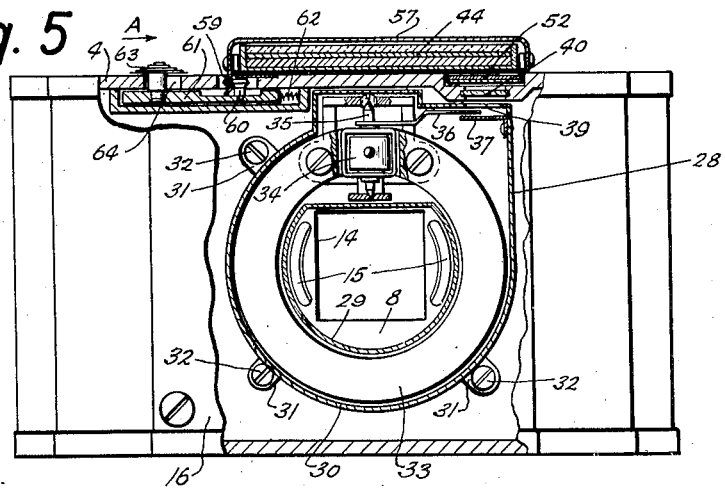
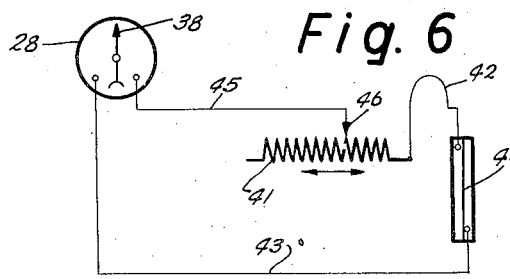

2,122,865

UNITED STATES PATENT OFFICE 2,122,865

PHOTOGRAPHIC CAMERA

Heinz Küppenbender, Dresden, Germany, assignor to Zeiss Ikon Aktiengesellschaft, Dresden, Germany Application June 8, 1936, Serial No. 84,147
In Germany June 15, 1935

11 Claims. (Cl. 88—23)

The invention relates to improvements in photographic cameras and particularly pertains to miniature cameras which are combined with a photoelectric exposure meter.

It is an object of the invention to mount the photoelectric cell of the exposure meter foldably upon one of the narrow walls of the camera casing in such a manner that in inoperative position of the exposure meter the photoelectric cell is folded flat against the narrow wall, while in the operative position the photoelectric cell extends substantially at a right angle with respect to said narrow wall and faces the object to be photographed. In a preferred embodiment of the invention the photoelectric cell is foldably mounted upon the upper narrow top wall of the camera casing.

Another object of the invention is to provide the carrier in which the photoelectric cell is arranged with a cover which is adapted to protect the photoelectric cell in its inoperative position against the action of light rays.

Still another object of the invention is to attach the cover for the photoelectric cell in such a manner on the carrier that in the operative position of the photoelectric cell the cover serves as a screen which keeps the light from above away from the cell.

Another object of the invention resides in a novel arrangement of the observation device for the measuring instrument of the exposure meter. The observation device consists of a foldable mirror which in the preferred embodiment of the invention is automatically moved into operative position when the photoelectric cell is moved into operative position, whereby the direction of viewing the indication of the measuring instrument in said mirror is the same in which the photographer views the object he intends to photograph.

With these and other objects in view, which will appear as the description proceeds the invention consists in the novel features of construction, combination of elements and arrangement of parts as hereinafter more fully described.

In the accompanying drawings:

Fig. 1 is a top view of a miniature rollfilm camera with the casing partially in section on the line I—I of Fig. 2 to illustrate the position of the field magnet of the measuring instrument.

Fig. 2 is a front elevation view of the rollfilm camera, with the photoelectric cell in operative position.

Fig. 3 is a side elevation view of the rollfilm camera of Fig. 2 partly in section on the line III—III of Fig. 2.

Fig. 4 is a rear elevation view of the rollfilm camera of Fig. 2.

Fig. 5 is a front elevation view of the rollfilm camera, with a portion of the front wall removed and partly in section substantially on line V—V of Fig. 1 to illustrate the position of the measuring instrument and its associated field magnet, and Fig. 6 is a wiring diagram of the photoelectric exposure meter.

As shown in Fig. 1 the camera casing consists of two separable sections 5 and 6 of which the latter forms a rear cover adapted to permit access to the interior of the front section 5 for the insertion and removal of a roll film. The front section 5 is provided at each end with a semi-cylindrical recess 7 for receiving the customary film supply and take-up spools respectively. In the present instance the front section 5 is integrally formed with a film supporting wall 8 located substantially in the image plane and against which the film is pressed by a backing plate 9 yieldingly attached at 10 to the inner wall of the rear cover section 6. The film which is taken from the supply spool indicated at 11 is moved over the film supporting wall 8, and passes over a sprocket roller 12 before wound upon the take-up spool 13.

The film supporting wall 8 is provided with a rectangular image opening 14 and on its side facing the front wall 16 of the front section 5 are arranged two forwardly projecting flanges 15. These flanges 15 may be curved concentrically about the optical axis of the lens system 17 which is detachably attached to the front wall 16.

According to Fig. 1 the shutter device 20 is arranged as a unit in the front section 5 of the camera casing between the front ends of the flanges 15 and the front wall 16 which supports the lens system 17.

The adjustment of the shutter device 20 for the various exposure times is effected by rotating a ring 22 which is rotatably mounted on the shutter device and has attached thereto an outwardly projecting stud 23, passing through a slot 24 in the front wall 16 of the camera casing and carrying a pointer 25 with an actuating knob 26 thereon. This pointer 25 is adapted to be set manually opposite any scale division of an exposure time scale 27 which in the present instance is arranged on a front wall portion of the camera casing.

The measuring instrument of the photoelectric exposure meter is arranged in a space which normally remains vacant in the ordinary cameras.

It will be noted from Figs. 1 and 5, that the measuring instrument is provided with a casing 28 of substantially annular shape whose axis is coaxial with the optical axis of the lens system. The inner nearly circular wall 29 of the casing 28 surrounds the flanges 15 which project forwardly from the film supporting wall 8. The outer substantially circular wall 30 of the casing 28 is provided with lugs 31 through which screws 32 pass which secure the casing and therewith the entire measuring instrument as a self-contained structure in the front section 5 of the camera casing. In the annular portion of the casing 28 is positioned the circular field magnet 33 which is open at its upper portion to receive between its ends the armature 34 which is secured to a vertically arranged rotatable shaft 35 which also has secured thereto the pointer 36. According to Fig. 5 the casing 28 is provided at its upper right hand portion with an extension in which is arranged the scale 37 provided with a mark 38 opposite which the pointer 36 is to come to rest during the adjustment of the exposure meter. In a horizontal wall portion of the casing 28 and directly above the scale 37 is arranged an opening 39 which lies directly below a window 40 arranged in the top wall of the camera casing and through which the measuring instrument may be read.

Immediately above the window 40 there is arranged in the upper face of the top wall 4 of the camera casing a recess 51 in which is mounted a foldable mirror 52 which is pivotally attached at 53 adjacent the forward edge of said recess 51, (Figs. 1 and 3). This mirror 52 is automatically moved by a spring 54 into its operative position, as shown in Figs. 3 and 4, when the photoelectric cell 44 is moved into operative position as will be described later. As will be noted from Fig. 4 the image of the scale 37 and pointer 36 as appearing in the mirror 52 can be observed by locking upon the inclined mirror 52 in the same direction the camera faces the object to be photographed.

The exposure meter is provided with a variable resistance 41 which is mounted on the rotatable ring 22 of the shutter device 20. One end of the resistance 41, according to Fig. 6 is connected by a flexible conductor 42 with one terminal of the photoelectric cell 44. Another conductor 43 leads from the other terminal of the photoelectric cell to one terminal of the measuring instrument whose other terminal is connected by a conductor 45 with a resilient contact member 46 which slidably engages the resistance 41. The contact member 46 is mounted on a ring 47 which is rotatably mounted on the inner face of the front wall 16 of the camera casing and coaxial with the optical axis of the lens system 17. This ring 47 is provided with an outwardly extending bracket 48 which passes through a curved slot 49 in the front wall 16 of the camera casing and is adapted to be coupled with the diaphragm adjusting ring 50 of the lens system 17.

The photoelectric cell 44 is mounted in suitable carrier 54 which is pivotally attached by means of a hinge pin 55 upon the narrow top wall 4 of the camera casing adjacent the front edge. A coiled spring 56 which is supported by a hinge pin 55 is adapted to move and maintain the carrier 54 in a vertical position (Figs. 2, 3, 4) in which the photoelectric cell 44 faces the object to be photographed. The photoelectric cell 44 is moved into inoperative position by folding the carrier 54 downwardly upon the top wall 4 of the camera casing. During this folding action the carrier 54 engages with its rear face the upwardly inclined mirror 52 and folds the latter likewise downwardly until it comes to lie in the recess (Fig. 5).

On the upper edge of the carrier 54 for the photoelectric cell 44 is hingedly secured a cover 57 which in the operative position of the photoelectric cell 44, as shown in Figs. 2 and 3 is automatically moved by one or more springs 58 upwardly away from the front face of the photoelectric cell 44 so as to form a screen or hood which prevents the light from above from striking the photoelectric cell. The cover 57 is provided on one of its edges with an angularly bent tongue 59 adapted to be engaged by a locking pin 60 when the cover 57 and the photoelectric cell 44 are folded into inoperative position as shown in Fig. 5. The locking pin 60 is attached to a spring influenced slidable member 61 mounted in a recess 62 in the underside of the top wall 4 of the camera casing (Fig. 5). This slidable member 61 is adapted to be manually moved in the direction of the arrow A by a button 63 which extends through a slot 64 in the top wall 4 to the outside of the camera casing.

The operation of the camera, as far as the adjustment of the camera with the assistance of the exposure meter is concerned is as follows:

If it is desired to take a photograph with a certain exposure time, for instance 1/25 of a second, the shutter adjusting pointer 25 is set opposite the respective scale division of scale 27 and then, while pointing the lens system toward the scene to be photographed, the diaphragm adjusting ring 50 is rotated until the pointer 36 of the measuring instrument is brought opposite the mark 38, which indicates that the diaphragm has been adjusted to the correct opening for the prevailing light condition and the desired exposure time. During the adjustment of the shutter, the resistance 41 is rotated and during the adjustment of the diaphragm the contact member 46 is rotated and moved along the resistance 41 to vary the amount of resistance in the circuit of the exposure meter, while the photoelectric cell 44 due to the light falling upon it, is energized to supply the electric current for operating the indicating instrument.

It is, however, also possible to select first a certain diaphragm opening for the scene to be photographed and then to adjust the shutter for the respective exposure time. This is done by moving first the diaphragm adjusting ring 50 to the desired diaphragm opening and then adjusting the pointer 25 of the shutter device until the pointer 36 of the measuring device comes to rest opposite the mark 38.

What I claim as my invention is:

1. In a photographic camera, the combination of a photoelectric exposure meter, a camera casing, a photoelectric cell, a carrier for said photoelectric cell pivotally connected to the outside of said camera casing and adapted to support said photoelectric cell selectively in operative position in which the cell projects outwardly from the camera casing and in an inoperative position flat on said casing, spring means for urging said carrier into operative position with the plane of the cell substantially parallel to the plane of the film at the exposure aperture in the camera, means adapted to lock said carrier in its inoperative position and means mounted on said carrier adapted to cover and uncover the photoelectric cell, said last named means when uncovering said cell when the latter is in operative position being movable to a position in which it protects the cell against light coming from above.

2. In a photographic camera, the combination of a photoelectric exposure meter, a camera casing, a photoelectric cell, a carrier for said photoelectric cell pivotally connected to the outside of said camera casing and adapted to support said photoelectric cell selectively in operative position and in an inoperative position flat on said casing, spring means for urging said carrier into operative position with the plane of the cell substantially parallel to the plane of the film at the exposure aperture in the camera, cover means for said cell pivotally mounted upon the top of said carrier having spring means for urging the cover means to a position substantially normal to the plane of the cell when the latter is in operative position to protect the cell from light coming from above and means for locking said cover means in its cell covering position and said carrier in its position flat on the casing.

3. In a photographic camera, the combination of a photoelectric exposure meter, a camera casing, a photoelectric cell, a carrier for said photoelectric cell pivotally connected to the outside of said camera casing and adapted to support said photoelectric cell selectively in operative position and in an inoperative position flat on said casing, spring means for urging said carrier into operative position with the plane of the cell substantially parallel to the plane of the film at the exposure aperture in the camera, cover means for said photoelectric cell pivotally mounted upon the top of said carrier having spring means for urging the cover means to a position substantially normal to the plane of the cell when the latter is in operative position to protect the cell from light coming from above, and means for locking said cover means when it covers said cell to said camera casing when the carrier including the photoelectric cell thereon is folded into inoperative position.

4. In a photographic camera, the combination of a photoelectric exposure meter, a camera casing having a top wall, a measuring instrument forming a part of said exposure meter mounted within said camera casing, means for rendering visible from the outside the indications of said measuring instrument, said means including a window in said top wall and a mirror pivotally attached to said top wall and extending in its operative position outwardly and at an angle with respect to said top wall to reflect the indications of the measuring instrument rearwardly; a photoelectric cell and means for foldingly mounting said photoelectric cell upon said top wall, said last named means being adapted to engage said mirror to fold the same downwardly into inoperative position when the photoelectric cell is folded into inoperative position.

5. In a photographic camera, the combination of a photoelectric exposure meter, a camera casing having a top wall, a measuring instrument forming a part of said exposure meter mounted within said camera casing, means for rendering visible from the outside the indications of said measuring instrument, said means including a window in said top wall and a mirror pivotally attached to said top wall and extending in its operative position outwardly and at an angle with respect to said top wall to reflect the indications of the measuring instrument rearwardly; a photoelectric cell and means for foldingly mounting said photoelectric cell upon said top wall, said last named means being adapted to engage said mirror to fold the same downwardly into inoperative position when the photoelectric cell is folded into inoperative position, said photoelectric cell and said mirror being each provided with means for automatically moving these members upwardly into operative position.

6. In a photographic camera, the combination of a photoelectric exposure meter, a camera casing having a top wall, a measuring instrument forming a part of said exposure meter mounted within said camera casing, means for rendering visible from the outside the indications of said measuring instrument, said means including a window in said top wall and a mirror pivotally attached to said top wall and extending in its operative position outwardly and at an angle with respect to said top wall to reflect the indications of the measuring instrument rearwardly; a photoelectric cell, means for foldingly mounting said photoelectric cell upon said top wall, said last named means being adapted to engage said mirror to fold the same downwardly into inoperative position when the photoelectric cell is folded into inoperative position, said photoelectric cell and said mirror being each provided with means for automatically moving these members upwardly into operative position, and a cover for said photoelectric cell arranged to uncover the photoelectric cell automatically when the same is moved into operative position.

7. In a photographic camera, the combination of a photoelectric exposure meter, a camera casing having a top wall, a measuring instrument forming a part of said exposure meter mounted within said camera casing, means for rendering visible from the outside the indications of said measuring instrument, said means including a window in said top wall and a mirror pivotally attached to said top wall and extending in its operative position outwardly and at an angle with respect to said top wall to reflect the indications of the measuring instrument rearwardly; a photoelectric cell, means for foldingly mounting said photoelectric cell upon said top wall, said last named means being adapted to engage said mirror to fold the same downwardly into inoperative position when the photoelectric cell is folded into inoperative position, said photoelectric cell and said mirror being each provided with means for automatically moving these members upwardly into operative position, a cover for said photoelectric cell arranged to uncover the photoelectric cell automatically when the same is moved into operative position, and means for locking said cover to said top wall when said photoelectric cell and said mirror are folded into inoperative position.

8. In a photographic camera, the combination of a photoelectric exposure meter, a camera casing having a top wall, a measuring instrument forming a part of said exposure meter mounted within said camera casing, means for rendering visible from the outside the indications of said measuring instrument, said means including a window in said top wall and a mirror pivotally attached to said top wall and extending in its operative position outwardly and at an angle with respect to said top wall to reflect the indications of the measuring instrument rearwardly; a photoelectric cell, means for foldingly mounting said photoelectric cell upon said top wall, said last named means being adapted to engage said mirror to fold the same downwardly into inoperative position when the photoelectric cell is folded into inoperative position, and a cover for said photoelectric cell arranged to uncover the photoelectric cell when the same is moved into its vertical operative position, said cover in this position of the photoelectric cell forming a screen which protects said cell against light rays from above.

9. In a photographic camera, the combination of a photoelectric exposure meter, a camera casing, a photoelectric cell, means pivotally attached to said casing for positioning said cell selectively flat against a wall of said camera and at an angle to said wall respectively, in which last named position the active face of the cell is directed toward the object to be photographed, and means mounted on said cell-positioning means for protecting the active face of said cell from light coming from above when the cell is in operative position, said cell-protecting means being movable from the position where it protects the cell from light coming from above to a position where it serves as a cover for the cell when the latter is in inoperative position.

10. In a photographic camera, the combination of a photoelectric exposure meter, a camera casing having a top wall, a photoelectric cell, means pivotally attached to said casing for moving said cell selectively into inoperative position flat against the outer face of said top wall and into operative position substantially normal to said top wall, in said last named position the active front face of said cell facing the object to be photographed, and means mounted on said cell-moving means for protecting the active face of said cell from light coming from above when the cell is in operative position, said cell-protecting means being movable from the position where it protects the cell from light coming from above to a position where it serves as a cover for the cell when the latter is in inoperative position.

11. In a photographic camera, the combination of a photoelectric exposure meter, a camera casing having a top wall, a photoelectric cell, a carrier for said photoelectric cell mounted movably on said camera casing for moving said cell selectively into inoperative position flat against the outer face of said top wall and into operative position substantially normal to said top wall, in said last named position the active front face of said cell facing the object to be photographed, and means mounted on said carrier and movable with said cell for protecting the active face of the cell from light coming from above when the cell is in operative position, said last named means being movable relatively to said cell to a position where it serves as a cover for the same when the cell is in inoperative position.

HEINZ KÜPPENBENDER.